March 30, 1926.  T. B. DRESCHER  1,578,722

INDICATING INSTRUMENT

Filed Jan. 20, 1923

INVENTOR.
Theodore B. Drescher
BY Frederick F. Church
his ATTORNEY

Patented Mar. 30, 1926.

1,578,722

UNITED STATES PATENT OFFICE.

THEODORE B. DRESCHER, OF ROCHESTER, NEW YORK.

INDICATING INSTRUMENT.

Application filed January 20, 1923. Serial No. 613,901.

*To all whom it may concern:*

Be it known that I, THEODORE B. DRESCHER, a citizen of the United States, residing at Rochester, in the county of Monroe and State of New York, have invented certain new and useful Improvements in Indicating Instruments; and I do hereby declare the following to be a full, clear, and exact description of the same, reference being had to the accompanying drawings, forming a part of this specification, and to the reference numerals marked thereon.

This invention relates to indicating instruments and more particularly to the variety, such as thermometers, adapted for association with the radiator cap of an internal combustion motor for indicating the temperature or other condition of the cooling system and of the motor proper. The chief object of the invention is to provide a simple and practical instrument of this variety comprising but few parts which may be inexpensively manufactured and assembled. To these and other ends the invention resides in certain improvements and combinations of parts all as will hereinafter be more fully described, the novel features being pointed out in the claims at the end of the specification.

In the drawings.

Similar reference numerals throughout the several views indicate the same parts.

Figure 1:
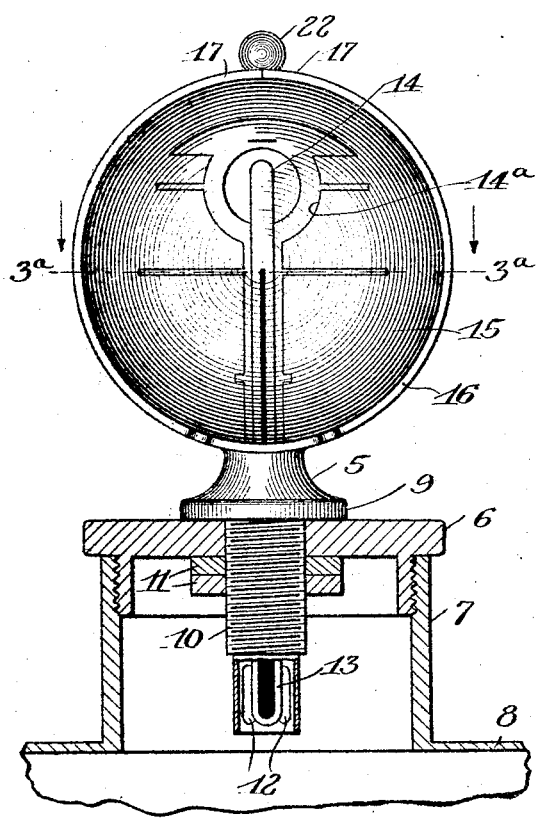
Figure 1 is a front elevation of an instrument embodying the present invention.
Figure 2:
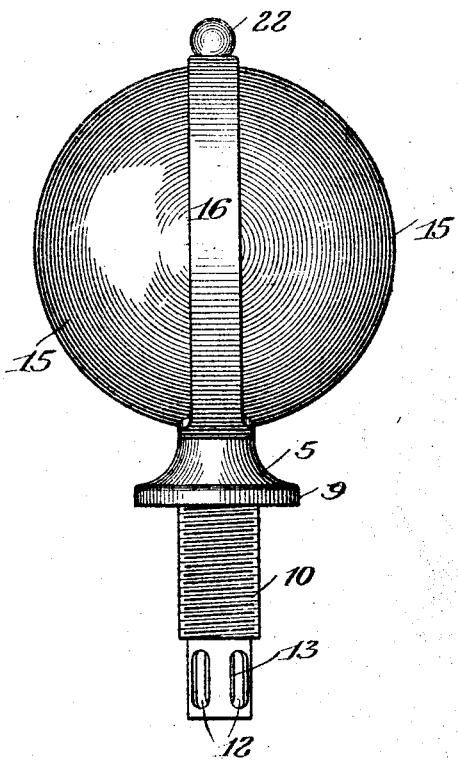
Figure 2 is a side elevation of the same.

The invention is embodied in the present instance in an indicating thermometer and mounting particularly adapted to be carried by the radiator cap of an internal combustion motor of an automobile, for example, for indicating at all times, so as to be visible from the driver's seat, the temperature developed in the radiator. The present improvements pertain more especially to the mounting for the temperature responsive element or thermometer which latter, as shown in the present instance, is of the common variety having a bulb for subjection to the temperature to be measured and an extended tubular indicating stem.

Referring more particularly to the drawings, the mounting comprises, preferably, a substantially tubular frame 5 in the bore of which the thermometer is carried and which is adapted for insertion through an opening provided in a radiator cap shown at 6 as of the usual type for closing the filling spout 7 of the radiator 8. Frame 5 is formed with a flange 9 adapted to be seated against the outer side of the radiator cap and with a threaded tubular portion 10 passing through the cap opening and fitted with locking nuts 11 for securing the instrument to the cap. The lower end of the frame has openings 12 formed therein for exposing the thermometer bulb 13 to the radiator temperature. The stem of the thermometer is shown at 14 as extended outwardly or above the cap so as to be clearly visible from the driver's seat. At 14ª is a dial plate supported by means hereafter described adjacent the thermometer stem and marked with suitable indicia for indicating cooperation with the thermometer fluid.

Figure 3:
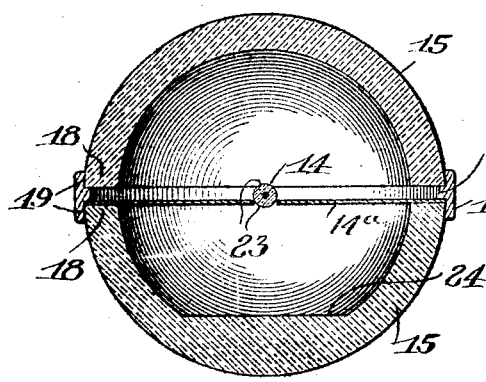
Figure 3 is a sectional plan view on the line 3ª—3ª of Figure 1.
Figure 4:
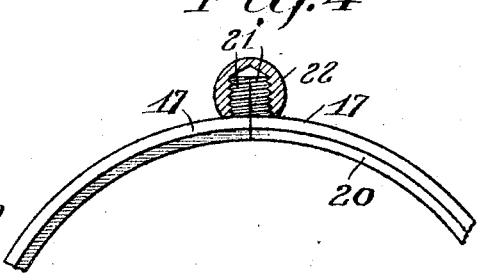
Figure 4 is a fragmentary detail view partly in section illustrating the means for mounting and clamping the crystals in position.

It is desirable to provide for the indicating portion of the thermometer comprising the stem and dial described, crystal means for protecting the same and also serving, if desired, as magnifying lenses for increasing the visibility of the indications. Such means preferably have the form of substantially hemispherical crystals 15 as hereafter described. For supporting the crystals 15, frame 5 preferably has fixed on its upper end a transversely extending strap 16 of resilient metal, having its ends 17 brought together opposite the frame, by means described below, to form a substantially circular flexible loop for embracing and clamping the crystals in position. The crystals as stated are in the form, substantially of hemispheres, the plane bases 18 of which are received in seats 19 formed inwardly from each side of strap 16, as shown more particularly in Figure 3. These seats preferably have spherically formed sides conforming to the peripheral surface of the crystals with an intermediate ledge or projection 20 serving to slightly space the crystals. It is apparent from this construction that by separating the strap end 17 to expand the loop the hemispheres may be readily arranged in the seats of the latter with their bases in juxtaposition enclosing the thermometer indicating means and the loop may then be drawn into effective clamping relation with the crystals by means comprising projections or sections 21, Figure 4, on the ends of the strap and together forming a stud which is threaded and tapered in shape, if desired, for the reception of a capping nut 22 adapted when screwed home to draw the ends of the band together in tight clamping engagement with the crystals which are thus firmly and securely clamped to the frames.

The scale plate 14<sup>a</sup> is preferably located in one of the seats 19 of the strap 16 beneath a crystal, so that it also is secured in position by the means for clamping the latter. If necessary the crystals may be slightly indented as at 23, Figure 3, to permit them to be brought close together and at the same time clear the thermometer stem.

The crystals are preferably in the form of hollow glass hemispheres as shown as these lend themselves effectively to cooperation with the clamping means described above. Crystals of this shape have been found to afford good optical effects and may also be utilized as magnifying lenses by suitable formation of their inner surfaces as indicated at 24. Crystals having this form furthermore afford a pleasing appearance to the instrument as a whole.

As apparent from the above description the construction is exceedingly simple and unitary in character comprising a minimum number of parts which may be economically manufactured and assembled in securely clamped relation with each other capable of withstanding any vibration to which the instrument may be subjected in use. The simplicity of line of the frame combines with the spherical form of the crystals to afford for the instrument as a whole a pleasing and attractive appearance.

I claim as my invention:

1. In a device of the class described, the combination of a frame including a pair of yieldable arms provided with means for attaching the same to a radiator cap, a temperature responsive element carried by the frame having a portion arranged to extend below the inner side of the cap for subjection to the radiator temperature and also a visible indicating portion extended above the outer side of the cap, a pair of crystals substantially in the form of hemispheres arranged with their bases in juxtaposition and enclosing said indicating portion therebetween, said bases being disposed between said arms and clamping means on the arms adapted to draw them tightly into engagement with the crystals.

2. In a device of the class described, the combination of a frame provided with means for attaching the same to a radiator cap, a temperature responsive element carried by the frame having a portion arranged to extend below the inner side of the cap for subjection to the radiator temperature and also a visible indicating portion extended above the outer side of the cap, a pair of crystals substantially in the form of hemispheres arranged with their bases in juxtaposition and enclosing said indicating portion therebetween, a flexible metal strap on said frame having its ends brought together to form a loop encircling the bases of said hemispheres, and means for drawing the ends of said strap together to clamp said crystals in position on the frame.

3. In a device of the class described, the combination of a frame provided with means for attaching the same to a radiator cap, a temperature responsive element carried by the frame having a portion arranged to extend below the inner side of the cap for subjection to the radiator temperature and also a visible indicating portion extended above the outer side of the cap, a pair of crystals substantially in the form of hollow hemispheres arranged with their bases in juxtaposition and enclosing said indicating portion therebetween, one of said crystals having its inner surface opposite its base shaped to produce a magnifying lens, and clamping means on the frame encircling said hemisphere bases and having a clamping movement in the plane thereof for securing said crystals to the frame.

4. In a device of the class described, the combination of a frame provided with means for attaching the same to a radiator cap, a temperature responsive element carried by the frame having a portion arranged to extend below the inner side of the cap for subjection to the radiator temperature and also a visible indicating portion extended above the outer side of the cap, a pair of crystals substantially in the form of hollow hemispheres arranged with their bases in juxtaposition and enclosing said indicating portion therebetween, one of said crystals having its inner surface opposite its base shaped to produce a magnifying lens, a flexible metal strap on said frame having its ends brought together to form a loop encircling the bases of said hemispheres, and means for drawing the ends of said strap together to clamp said crystals in position on the frame.

5. In a device of the class described, the combination of a tubular frame for insertion through an opening in the top of a radiator cap and provided with means for attaching the same to the cap, a temperature responsive element in the bore of said frame having a portion arranged to extend below the inner side of the cap for subjection to the radiator temperature and also an indicating portion extended into view above the outer side of the cap, a pair of crystals substantially in the form of hemispheres arranged with their bases in juxtaposition to enclose said indicating portion therebetween, a flexible metal strap on said frame having its ends brought together to form a loop encircling the bases of said hemispheres with seats formed in said strap from each side to receive said bases, threaded stud sections on said loop ends, and a capping nut for engagement with said sections to hold said loop in clamping engagement with said crystals.

6. In a device of the class described the combination of a frame for a temperature responsive element including a base having oppositely extended arms with their free ends terminating in juxtaposition and provided with upstanding portions disposed one adjacent another, a pair of crystals substantially in the form of hemispheres disposed between said arms and constructed to permit the temperature responsive element to be inserted therein, and connecting means for said upstanding portions adapted to cause said arms to be clamped upon the crystals.

7. In a device of the class described, the combination of a frame for a temperature responsive element including a base having oppositely extending arms with their free ends provided with offset portions terminating in juxtaposition and each of the arms being provided with an inwardly extending rib, a pair of crystals substantially in the form of hemispheres having their bases disposed on the opposite sides of said ribs, and in engagement with the inner faces of said arms, and means for connecting the offset portions of the arms to clamp them upon the crystals.

THEODORE B. DRESCHER.